US012706518B2

(12) United States Patent
Ramorini et al.

(10) Patent No.: US 12,706,518 B2
(45) Date of Patent: Aug. 11, 2026

(54) CLOSED LOOP DUMMY LOAD TO LIMIT MINIMUM OPERATING FREQUENCY IN CURRENT MODE CONTROL DCDC

(71) Applicant: STMicroelectronics International N.V., Geneva (CH)

(72) Inventors: Stefano Ramorini, Milano (FR); Francesco Pinzin, Varese (FR)

(73) Assignee: STMicroelectronics International N.V., Geneva (CH)

( * ) Notice: Subject to any disclaimer, the term of this patent is extended or adjusted under 35 U.S.C. 154(b) by 261 days.

(21) Appl. No.: 18/610,606

(22) Filed: Mar. 20, 2024

(65) Prior Publication Data

US 2025/0300545 A1 Sep. 25, 2025

(51) Int. Cl.
*H02M 1/00* (2006.01)

(52) U.S. Cl.
CPC ....... *H02M 1/0032* (2021.05); *H02M 1/0025* (2021.05)

(58) Field of Classification Search
CPC ............. H02M 1/0032; H02M 1/0025; H02M 3/1582; Y02B 70/10
See application file for complete search history.

(56) References Cited

U.S. PATENT DOCUMENTS 7,609,039 B2 * 10/2009 Hasegawa ........... H02M 3/1588 323/273
12,374,993 B2 * 7/2025 Rosa .................. H02M 1/0045
2005/0270005 A1 * 12/2005 Horner ................. H02M 3/156 323/283
2008/0225563 A1 * 9/2008 Seo ....................... H02M 3/156 363/123
2009/0027024 A1 * 1/2009 Dequina ................. H02M 1/38 323/283
2022/0109371 A1 4/2022 Seetharaman et al.
2025/0317043 A1 * 10/2025 Bertolini ............. H02M 1/0019

FOREIGN PATENT DOCUMENTS

CN 104300773 B 4/2017
CN 111900439 A 11/2020
CN 116054565 A 5/2023
EP 4199333 A1 6/2023
JP 2022106006 A 7/2022

OTHER PUBLICATIONS

Texas Instruments LMR70503: “Simple Switcher® Buck-Boost Converter for Negative Output Voltage in µSMD,” 2012, 19 pgs.

* cited by examiner

*Primary Examiner* — Kyle J Moody
(74) *Attorney, Agent, or Firm* — Crowe & Dunlevy LLC

(57) ABSTRACT

Described herein is a method of operating a DC-DC converter to avoid operating in PSM or PFM at light load, due to the possibility that uncontrolled low frequency content could be introduced. The method includes including driving a load demanding a load current with an output current, and when the output current is greater than a minimum output current, regulating the output current to be equal to the load current. When the output current is less than the minimum output current, the method includes regulating the output current to be equal to the minimum output current, and generating a dummy load current and then subtracting the dummy load current from the regulated output current that is equal to the minimum output current. The dummy load current is generated to be equal to a difference between the minimum output current and the load current.

19 Claims, 4 Drawing Sheets

$I_{OUT}$
Amp
Time
$T_{SW}$ $I_{OUT}$
Time
$T_{PFM}$ $I_{OUT}$
Pulse package
Time
$T_{SW}$
$T_{SW}$
$T_{PSM}$ $I_{OUT}$
Amp
Time
$T_{SW}$ $I_{OUT}$
Amp
Time
$T_{SW}$ $I_{OUT}$
Amp
Time
$T_{SW}$ $I_{OUT}$
Amp
Time
$T_{SW}$

CLOSED LOOP DUMMY LOAD TO LIMIT MINIMUM OPERATING FREQUENCY IN CURRENT MODE CONTROL DCDC

TECHNICAL FIELD

This disclosure is directed to the field of DC-DC conversion and, in particular, to the field of DC-DC converter control techniques and circuitry to provide for high efficiency in light load conditions.

BACKGROUND

The efficiency of DC-DC converters at light load conditions is an aspect of power management of concern in various electronic devices. Some traditional methods to maintain efficiency involve using either Pulse Frequency Modulation (PFM) or Pulse Skip Modulation (PSM), each with inherent limitations.

With PFM, the converter operates in a light load single pulse mode where the output current $I_{OUT}$ is balanced with the load current $I_{LOAD}$ by modulating the time period of each cycle ($T_{PFM}$) dependent on load. Shown in FIG. 1A is operation where the load current $I_{LOAD}$ is sufficiently high such that each cycle of the output current $I_{OUT}$ has a standard period of $T_{SW}$. As the load demand decreases, shown in FIG. 1B, the time period $T_{SW}$ increases to a PFM time period $T_{PFM}$ to maintain this balance, leading to an undesirable reduction in switching frequency without a lower bound, which can result in increased noise inside an undesired frequency bandwidth.

Similarly, PSM, as shown in FIG. 1C, also functions in a light load single pulse mode. The balance between $I_{OUT}$ and $I_{LOAD}$ is achieved by managing the number of pulses within a single pulse package with a single PSM time period and the modulation of the time period of PSM ($T_{PSM}$). A decrease in load current $I_{LOAD}$ results in an increase in $T_{PSM}$, which again introduces the issue of a lack of a minimum frequency limit, leading to potential noise problems.

The use of Discontinuous Conduction Mode (DCM) alone, as illustrated in FIGS. 1D and 1E, involves reducing the output current $I_{OUT}$ to lower the load current $I_{LOAD}$. However, this approach is limited by the practical constraints of the converter's drivers and control logic, which cannot synthesize infinitesimally small ON/OFF times ($T_{ON}$/$T_{OFF}$). Therefore, when the $I_{LOAD}$ falls below a certain threshold, corresponding to the minimum $T_{ON}$ or $T_{OFF}$ times that the converter can manage, the system inadvertently enters a natural skip mode. This unintended transition results in a natural PSM (FIG. 1F) in which the second pulse is separated from the previous first pulse by $2 \cdot T_{SW}$, or natural PFM (FIG. 1G), both of which are undesirable for the above-described reasons.

Prior attempts at controlling DC-DC converters in light load conditions include implementations of Forced Continuous Conduction Mode (CCM) and an open loop dummy load in Discontinuous Conduction Mode (DCM).

Forced CCM operates without a zero current comparator, allowing for positive and negative inductor current. This mode of operation does avoid the low-frequency harmonic content associated with PFM and PSM. By removing or disabling the zero current comparator, converters can be adapted to this mode, reducing design complexity and cost.

However, the Forced CCM mode is not without its disadvantages. The primary concern is the high switching losses incurred that lead to a significant reduction in efficiency at light load. These losses lead to a significant reduction in efficiency, as the converter does not benefit from the reduced switching events typically associated with PFM or PSM under low demand conditions. Consequently, while Forced CCM simplifies the circuit design, it does so at the expense of increased energy dissipation when handling minimal loads.

Using an open loop dummy load in DCM, where PSM and PFM are intentionally disabled, proceeds as follows. The dummy load current is sized to match a threshold current $I_{LOAD}$TH, which is the minimum load current that provides for safe ON/OFF times ($T_{ON}$/$T_{OFF}$) for the converter. This method keeps the converter operating above the threshold, avoiding the unintentional skip modes that can lead to natural PFM or PSM. However, this approach introduces a variety of inefficiencies. The dummy load is optimized for a no-load condition and remains constantly on, which means that even at light loads, there is a significant energy loss. For instance, if the threshold $I_{LOAD}$ TH is 100 mA, and the actual load is 99 mA, the system only requires an additional 1 mA for safe operation. Yet, the open loop dummy load would still impose an unnecessary 100 mA, vastly overshooting the minimum required additional current and thus wasting energy.

Therefore, further development is needed.

SUMMARY

Disclosed herein is a method of operating a DC-DC converter, including: driving a load demanding a load current with an output current; and when the output current is greater than a minimum output current, regulating the output current to be equal to the load current. When the output current is less than the minimum output current, the method includes: regulating the output current to be equal to the minimum output current; and generating a dummy load current and subtracting the dummy load current from the regulated output current that is equal to the minimum output current; wherein the dummy load current is generated to be equal to a difference between the minimum output current and the load current.

The minimum output current may provide for selected on and off times of the DC-DC converter that result in a minimum operating frequency of the DC-DC converter being maintained at a given level.

The method may further include determining whether the output current is greater than the minimum output current or less than the minimum output current by comparing a feedback voltage indicative of the output current to a first reference voltage to produce a control voltage.

The output current may be regulated to be minimum output current by: generating a sum voltage as a sum of a voltage ramp and a voltage indicative of current through an inductor of the DC-DC converter; comparing the control voltage to the sum voltage to produce a PWM signal; and controlling switching of the DC-DC converter based upon the PWM signal.

The dummy load current may be generated as a function of a difference between a reference dummy voltage representing a level of the control voltage $V_C$ at which the load current is equal to the minimum output current and the control voltage.

The reference dummy voltage may be determined based upon an input voltage to the DC-DC converter, an output voltage from the DC-DC converter, the load current, and a switching period of the DC-DC converter.

Also disclosed herein is a DC-DC converter system, including: a DC-DC converter driving a load demanding a load current with an output current at an output node; control voltage generation circuit configured to generate a control voltage based upon a comparison between a reference voltage and a feedback voltage indicative of the output current; wherein the DC-DC converter is configured to regulate the output current to be equal to the load current when the control voltage is indicative of the output current being greater than a minimum output current; wherein the DC-DC converter is configured to regulate the output current to be equal to the minimum output current when the control voltage is indicative of the output current being less than the minimum output current; and a dummy load configured to generate a dummy load current that is equal to a difference between the minimum output current and the load current and subtract the dummy load current from the output current equal to the minimum output current when the control voltage is indicative of the output current being less than the minimum output current.

The dummy load may include a dummy current source transistor configured to generate the dummy load current as a function of a dummy gate control voltage; and a dummy control loop configured to generate the dummy gate control voltage as a function of a comparison between the control voltage and a reference dummy voltage.

Processing circuitry may be configured to generate the reference dummy voltage based upon an input voltage to the DC-DC converter, an output voltage from the DC-DC converter, the load current, and a desired switching period of the DC-DC converter.

The dummy control loop may include: a first amplifier having a non-inverting input coupled to the control voltage through a first resistor, with a second resistor being connected between the non-inverting input and an output of the first amplifier, and with the first amplifier having an inverting input coupled to the reference dummy voltage; a first n-channel transistor having a drain connected to an input of a current mirror, a source coupled to ground through a third resistor, and a gate coupled to the output of the first amplifier; a second n-channel transistor having a drain connected to an output of the current mirror, a source coupled to ground through a fourth resistor, and a gate coupled to the reference dummy voltage; and a fifth resistor connected between the output of the current mirror and the output node; wherein the dummy gate control voltage is formed at the output of the current mirror; and wherein a gain between the control voltage and the dummy gate control voltage is a function of a product of a first ratio and a second ratio, the first ratio being a ratio between resistances of the second resistor and the first resistor, the second ratio being a ratio between resistances of the fifth resistor and the third resistor.

The control voltage generation circuit may include a second amplifier having a non-inverting input coupled to a comparison voltage, and an inverting input connected to an output of the second amplifier, wherein the output of the second amplifier is connected to the first resistor.

A third amplifier may have a non-inverting input coupled to the feedback voltage, an inverting input coupled to the reference voltage, and an output at which the comparison voltage is generated.

A feedback divider may be coupled between a top voltage and the output node, with the feedback voltage being produced at a tap of the feedback divider.

Also disclosed herein is a method of operating a DC-DC converter to as to avoid operation in pulse skipping mode (PSM) or pulse frequency modulation (PFM) in light load conditions. The method includes: driving a load demanding a load current with an output current, and when the output current is less than a minimum output current, regulating the output current to be equal to the minimum output current, and generating a dummy load current and subtracting the dummy load current from the regulated output current that is equal to the minimum output current, wherein the dummy load current is generated to be equal to a difference between the minimum output current and the load current.

The minimum output current may provide for selected on and off times of the DC-DC converter that result in a minimum operating frequency of the DC-DC converter being maintained at a given level.

The method may further include determining whether the output current is greater than the minimum output current or less than the minimum output current by: comparing a feedback voltage indicative of the output current to a first reference voltage to produce a control voltage.

The output current may be regulated to be minimum output current by: generating a sum voltage as a sum of a voltage ramp and a voltage indicative of current through an inductor of the DC-DC converter; comparing the control voltage to the sum voltage to produce a PWM signal; and controlling switching of the DC-DC converter based upon the PWM signal.

The dummy load current may be generated as a function of a difference between a reference dummy voltage representing a level of the control voltage $V_C$ at which the load current is equal to the minimum output current and the control voltage.

The reference dummy voltage may be determined based upon an input voltage to the DC-DC converter, an output voltage from the DC-DC converter, the load current, and a switching period of the DC-DC converter.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

The control technique described herein enhances operation of DC-DC converters at light load, overcoming the above-described issues with existing PFM and PSM techniques as well as overcoming the energy losses present with Forced CCM mode and open loop dummy load implementations in DCM.

Figures 1A, 1B, 1C, 1D, 1E, 1F, 1G:
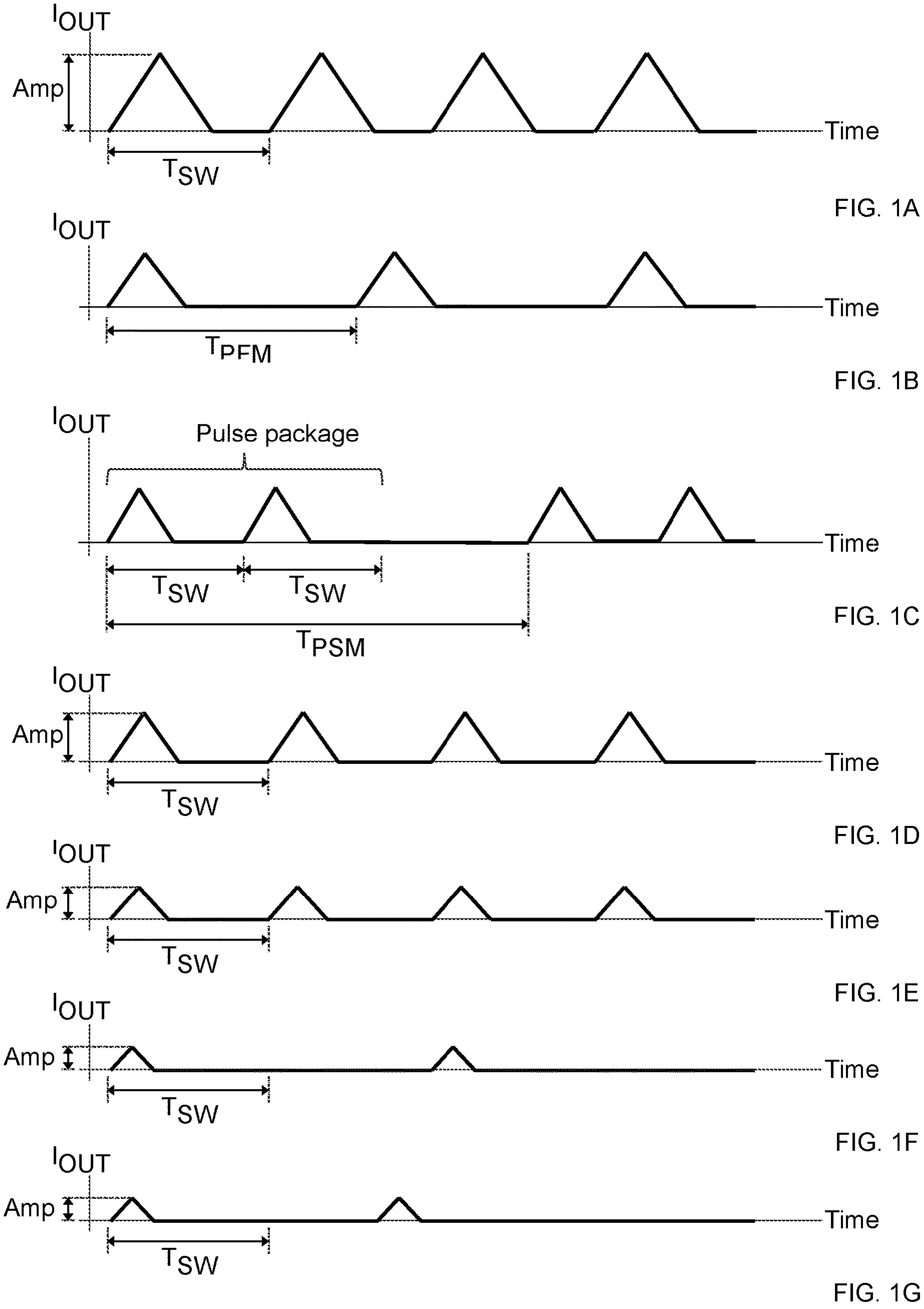
FIGS. 1A-1B are a series of graphs illustrating Pulse Frequency Modulation (PFM).
FIG. 1C is a graph illustrating Pulse Skip Modulation (PSM).
FIG. 1D is graph illustrating Discontinuous Conduction Mode (DCM).
FIG. 1E is a graph illustrating Discontinuous Conduction Mode (DCM).
FIG. 1F is a graph illustrating DCM resulting in natural PSM.
FIG. 1G is a graph illustrating DCM resulting in natural PFM.
Figures 2, 3A, 3B, 3C:
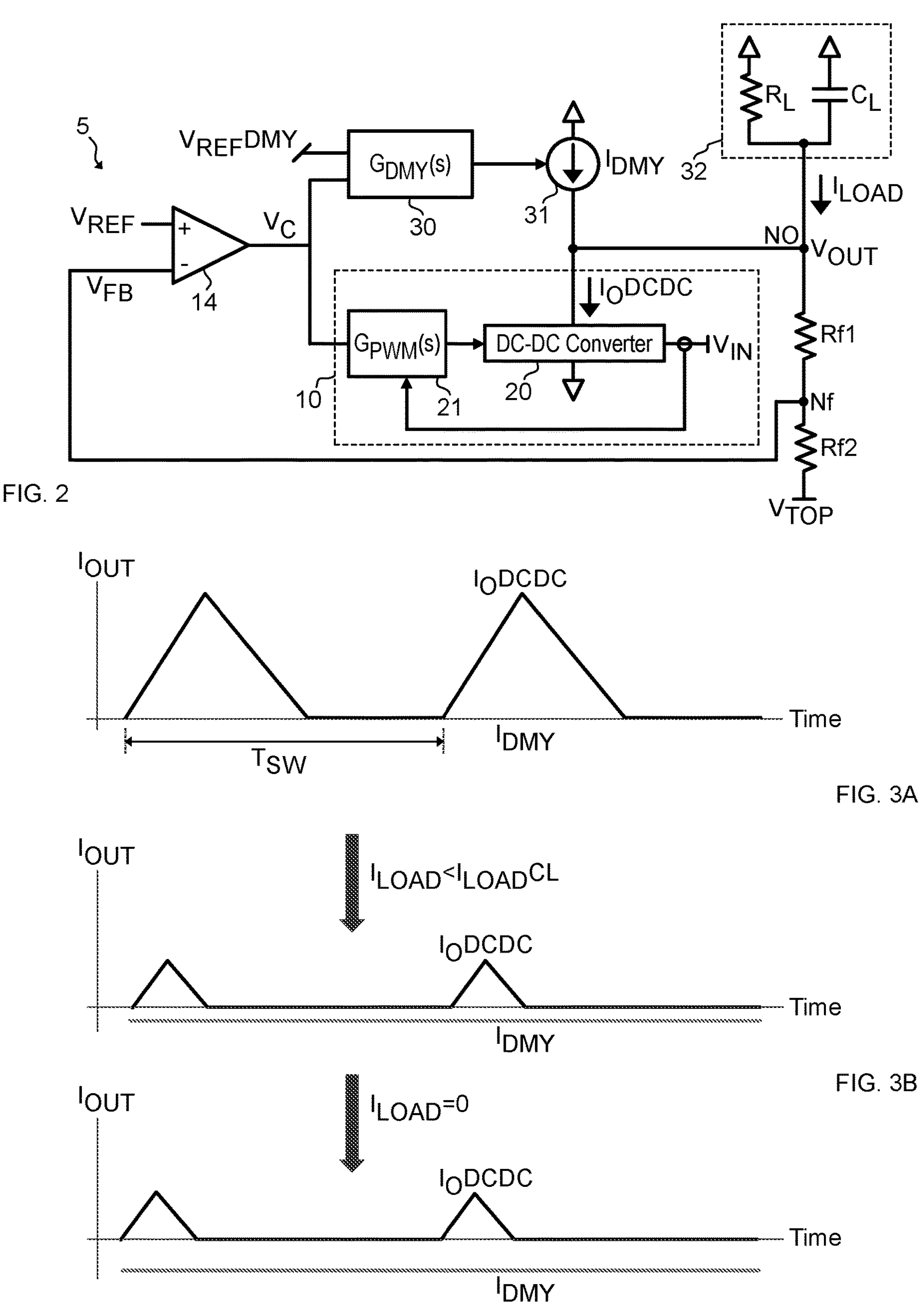
FIG. 2 is a block diagram of a DC-DC converter system disclosed herein.
FIGS. 3A-3C are a series of graphs illustrating the operating technique of the DC-DC converter system of FIG. 2.

The DC-DC converter system 5 implementing this technique is shown in FIG. 2. Utilized therein is a DC-DC converter 10 configured to operate in either CCM or DCM, with PFM and PSM both being disabled. The DC-DC converter system 5 includes an output node NO connected to receive a load current $I_{LOAD}$ from a load 32. The output voltage $V_{OUT}$ is sensed using a feedback divider formed by series connected resistors Rf1 and Rf2 connected between the output node NO, at which the output voltage $V_{OUT}$ is formed, and a top voltage $V_{TOP}$ (e.g., a programmable voltage). A feedback voltage $V_{FB}$ is formed at the tap Nf between series connected resistors Rf1 and Rf2.

A control voltage $V_C$ is generated by an error amplifier 14 as a function of a difference between a reference voltage $V_{REF}$ received at a non-inverting input terminal of the error amplifier 14 and the feedback voltage $V_{FB}$; as will be described in greater detail below, the control voltage $V_C$ is a function of the input voltage $V_{IN}$, the output voltage $V_{OUT}$, the switching period $T_{SW}$ of the DC-DC converter 10, and the load current $I_{LOAD}$.

Keeping this in mind, the DC-DC converter 10 includes a control loop 21 which receives the control voltage $V_C$ as input, and based thereupon, operates a power stage 20 to sink an output current $I_{OUT}$DCDC from the output node NO. A dummy load 31 sources a dummy current $I_{DMY}$ to the output node NO under control of a dummy control loop 30 based upon the control voltage $V_C$ and a dummy reference voltage $V_{REF}$DMY.

In operation, a threshold $I_{LOAD}$ CL for the load current $I_{LOAD}$ from the load 32 is set. The dummy reference voltage $V_{REF}$DMY represents a level of the control voltage $V_C$ at which the load current $I_{LOAD}$ is equal to the threshold $I_{LOAD}$ CL; therefore, the control voltage $V_C$ being below the dummy reference voltage $V_{REF}$DMY is indicative of the load current $I_{LOAD}$ being less than the threshold $I_{LOAD}$ CL.

If the load current $I_{LOAD}$ is above the threshold $I_{LOAD}$ CL, the control loop 21 of the converter 10, in DCM steady state, regulates the output current $I_{OUT}$DCDC of the power stage 20 to match the load current $I_{LOAD}$, unless the output current $I_{OUT}$DCDC would fall below the threshold $I_{LOAD}$ CL. If the load current $I_{LOAD}$ is above the threshold $I_{LOAD}$ CL, the dummy load current $I_{DMY}$ from the dummy load 31 is set by the dummy control loop 30 to zero, causing the system 5 to operate solely on the actual load 32 without incurring additional losses from the use of the dummy load 31. This operating condition is shown in FIG. 3A.

Conversely, if the gain between $V_C$ and $I_{DMY}$ is higher than the gain between $V_C$ and $I_{OUT}$DCDC, and $I_{LOAD}$ is below $I_{LOAD}$CL, as it is in the example shown in FIG. 3B, the control loop 21 clamps the output current $I_{OUT}$DCDC to the level of $I_{LOAD}$CL, while the dummy control loop 30 adjusts the dummy load current $I_{DMY}$ so that $I_{OUT}$DCDC=$I_{LOAD}$+$I_{DMY}$. This prevents the converter 10 from dropping into PFM or PSM modes and maintains compliance with the design constraints regarding the minimum ON and OFF times ($T_{ON}$ and $T_{OFF}$), which are to be maintained for proper operation.

In the case where the load current $I_{LOAD}$ is zero, the dummy current $I_{DMY}$ is adjusted by the control loop 30 such that $I_{OUT}$DCDC=$I_{DMY}$, as shown in FIG. 3C.

Note that $I_{LOAD}$CL is selected to be sufficiently high to ensure DCM operation of the DC-DC converter 10 and to avoid the DC-DC converter 10 violating the minimum $T_{ON}$ and $T_{OFF}$ times, which would transition the DC-DC converter 10 into natural PFM or PSM.

Figure 4:
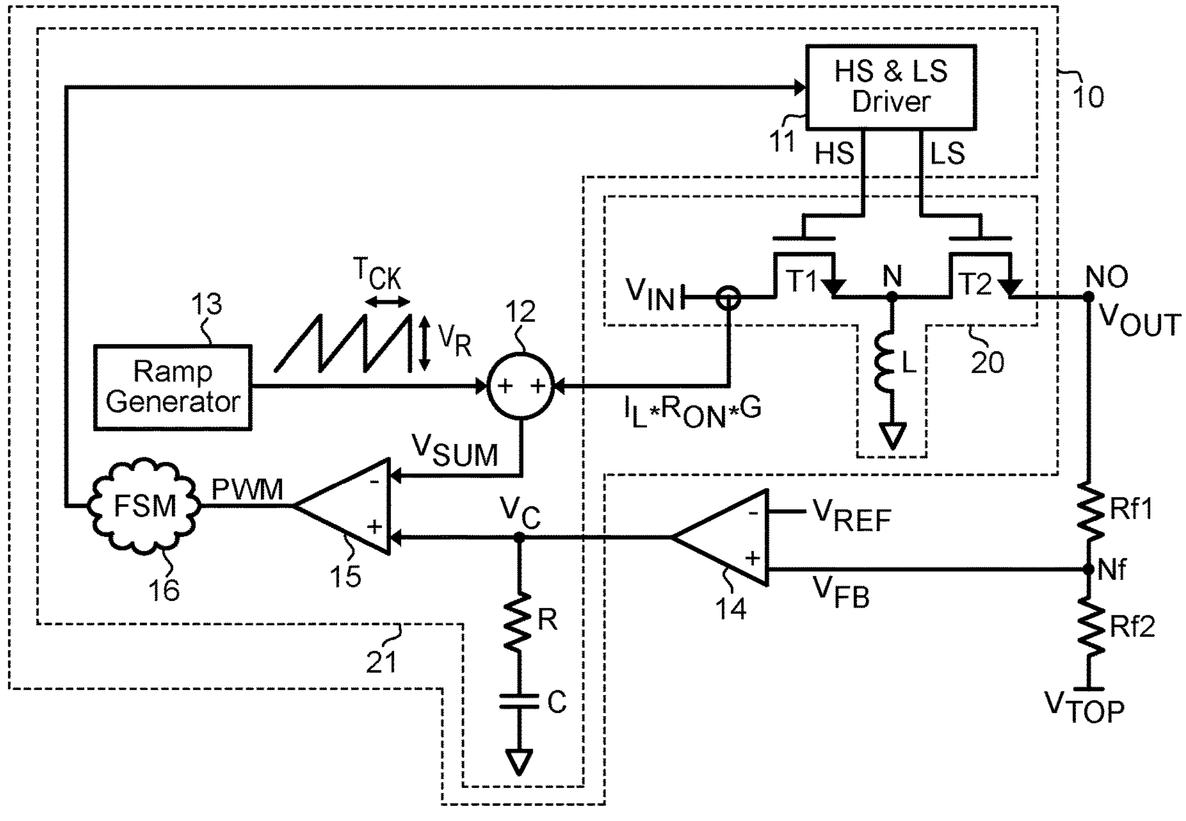
FIG. 4 is a schematic block diagram illustrating the DC-DC converter of the system of FIG. 2.

Details of the DC-DC converter 10 and the control therefor are now described with additional reference to FIG. 4. The DC-DC converter 10 includes a power stage 20 with: a high-side transistor T1, which is an n-channel transistor having its drain connected to an input voltage $V_{IN}$, its source connected to switching node N, and its gate coupled to receive a high-side control signal HS from a driver 11, operated by output from a finite state machine (FSM) 16; a low-side transistor T2, which is an n-channel transistor having its drain connected to node N, its source connected to an output node NO to provide the output voltage $V_{OUT}$, and its gate coupled to receive a low-side control signal LS from the driver 11; and an inductor L is connected between node N and ground.

A comparator 15 receives the control signal $V_C$ at its non-inverting input and a sum voltage $V_{SUM}$ at its inverting input, with a PWM signal being generated at the output of comparator 15 to be received by a finite state machine (FSM) 16. The FSM 16 controls the driver 11.

A ramp generator 13 generates a ramp signal having a period of $T_{CK}$ and an amplitude of $V_R$, which is received by summation circuit 12. Summation circuit 12 adds the ramp signal to a voltage signal representative of the drain current of transistor T1, which is $I_L \times R_{ON} \times G$ (the inductor current feedback), producing the sum voltage $V_{SUM}$ as a result. In this equation, $I_L$ is the inductor current, $R_{ON}$ is the on-resistance of transistor T1, and G is a gain factor for the current feedback.

In operation, when the feedback voltage $V_{FB}$ is greater than or equal to the reference voltage $V_{REF}$, the output of the error amplifier 14 rises, sourcing current to the capacitor C, causing the control voltage $V_C$ to rise. The PWM signal is asserted by the comparator 15 at the rising (or falling) edge of the clock signal, and when the control voltage $V_C$ falls to be less than the sum voltage $V_{SUM}$, the PWM signal is deasserted by the comparator 15. Based on this PWM signal, the FSM 16 controls the driver 11 to effectuate control of the converter 10.

Consider operation in DCM steady state peak current mode in which the output current $I_{OUT}$DCDC of the DC-DC converter 10 is to remain constant. The control voltage $V_C$ is a function of the input voltage $V_{IN}$, the output voltage $V_{OUT}$, the switching period $T_{SW}$ of the DC-DC converter 10, and the load current $I_{LOAD}$, and in this condition can be represented as:

$$V_C = V_R \times \frac{T_{ON}}{T_{SW}} + I_L Pk \times R_{ON} x G$$

In this equation, $T_{ON}$ is the on-time of the converter 10, and can be represented as:

$$T_{ON} = \frac{2 \times V_{OUT} \times I_{LOAD} \times L \times T_{SW}}{V_{IN}}$$

In this equation, $I_L$Pk is the peak current and can be calculated as:

$$I_L Pk = 2 \times I_{LOAD} \times \frac{T_{SW}}{T_{OFF}}$$

Continuing with the description of operation, if the load current $I_{LOAD}$ increases, keeping the input voltage $V_{IN}$, the output voltage $V_{OUT}$, and the switching period $T_{SW}$ of the DC-DC converter 10 constant, then the control voltage $V_C$ increases. Note here that due to the addition of the inductor current feedback ($I_L \times R_{ON} \times G$) to the ramp signal to produce the sum voltage $V_{SUM}$, the control voltage $V_C$ is ultimately regulated based upon the coil current $I_L$.

Figure 5:
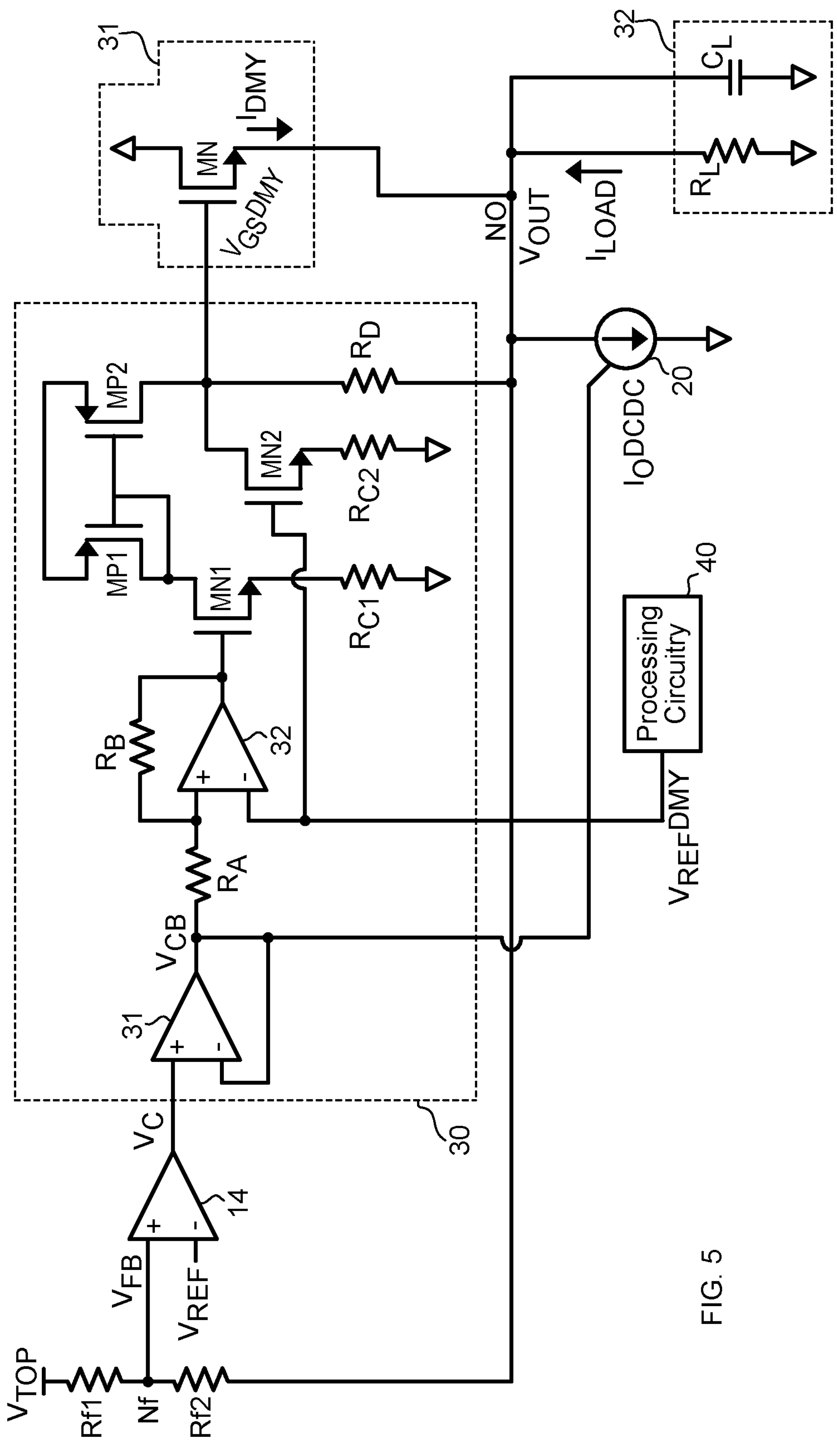
FIG. 5 is a schematic block diagram illustrating the dummy current source and dummy control loop of FIG. 2.

Details of the dummy load 31 and the dummy control loop 30 are now provided with reference to FIG. 5. The dummy load 31 is formed by an n-channel transistor MN having its drain coupled to ground, its source connected to the output node NO, and its gate voltage set by the dummy control loop 30.

The dummy control loop 30 includes an amplifier 31 in a unity gain configuration that buffers the control voltage $V_C$ to produce buffer voltage $V_{CB}$. A resistor $R_A$ is connected between the output of the amplifier 31 and the non-inverting input terminal of amplifier 32. A resistor $R_B$ is connected between the non-inverting input terminal of amplifier 32 and the output of amplifier 32. The inverting input terminal of amplifier 32 is coupled to the dummy reference voltage $V_{REF}$DMY, the details of the setting of which are provided in detail below. The output of amplifier 32 is connected to the gate of n-channel transistor MN1, which has its source coupled to ground through resistor $R_{C1}$ and its drain connected to the drain of p-channel transistor MP1. P-channel transistor MP1 has its source coupled to ground and its gate connected to its drain as well as to the gate of p-channel transistor MP2 in a current mirror relationship. The source of p-channel transistor is coupled to ground and its drain is connected to the gate of n-channel transistor MN. A resistor $R_D$ is connected between the gate of n-channel transistor MN and the output node NO. An n-channel transistor MN2 has its gate connected to the dummy reference voltage $V_{REF}$DMY, its drain connected to the gate of n-channel transistor MN, and its source coupled to ground through resistor $R_{C2}$. Note that resistors $R_{C1}$ and $R_{C2}$ may both have a resistance of $R_{C2}$ and that resistors $R_{C1}$, $R_{C2}$, $R_D$, $R_A$, and $R_B$ are matched, formed in the same technology, and the same type.

The dummy reference voltage $V_{REF}$DMY is generated by processing circuitry 40 and represents a level of the control voltage $V_C$ at which the load current $I_{LOAD}$ is equal to the threshold $I_{LOAD}$CL. Keeping this in mind, the dummy control loop sets the gate to source voltage $V_{GS}$DMY of the n-channel transistor MN to be:

$$V_{GS}DMY = (V_{REF}DMY - V_C) \times G_{DMY}, \text{ where } G_{DMY} = \frac{R_B}{R_A} \times \frac{R_D}{R_C}$$

Thus, when $V_C$ is greater than $V_{REF}$DMY, $V_{GS}$DMY serves to turn off transistor MN so that the dummy current $I_{DMY}$ is zero when $I_{LOAD}$ is above $I_{LOAD}$CL. Conversely, when $V_C$ is less than $V_{REF}$DMY, $V_{GS}$DMY serves to turn on transistor MN to source the dummy current $I_{DMY}$ to output node NO, with the dummy current $I_{DMY}$ rising proportionally as the difference between $V_{REF}$DMY and $V_C$ rises. Therefore, when $V_C$ is less than $V_{REF}$DMY (indicative of $I_{LOAD}$ being below $I_{LOAD}$ CL) and the gain of the dummy load path (the gain between $V_C$ and $I_{DMY}$) is higher than the gain between $V_C$ and $I_{OUT}$DCDC, the dummy control loop 30 adjusts the dummy load current $I_{DMY}$ so that $I_{OUT}$DCDC=$I_{LOAD}$+$I_{DMY}$, preventing the converter 10 from dropping into PFM or PSM modes.

The selection criteria for $V_{REF}$DMY is now described. $V_{REF}$DMY is set at the minimal value that guarantees that the resulting ON and OFF times ($T_{ON}$ and $T_{OFF}$) of the DC-DC converter 10 are maintained. It follows from this that the threshold $I_{LOAD}$ CL below which the dummy current $I_{DMY}$ is generated is minimized, minimizing efficiency losses due to the use of the dummy load 31. Since in DCM the ON and OFF times ($T_{ON}$ and $T_{OFF}$) are dependent on $V_{IN}$, $V_{OUT}$, $I_{LOAD}$, and $T_{SW}$, the proper selection of $V_{REF}$DMY is relatively complex. Therefore, $V_{REF}$DMY is generating by processing circuitry 40 utilizing a lookup table based on these values. For example, the lookup table may be a two-dimensional lookup table, with $V_{REF}$DMY being set as a function of $V_{OUT}$ and $T_{SW}$, as these parameters have a large influence on $V_{REF}$DMY. Alternatively, the lookup table may be a three-dimensional lookup table, with $V_{REF}$DMY being set as a function of $V_{IN}$, $V_{OUT}$, and $T_{SW}$.

The advantages of the DC-DC converter system 5 are numerous, as it ensures operation in DCM, which inherently sets a minimum operating frequency and avoids the generation of low-frequency harmonics. This feature is helpful in both DCM-PSM and DCM-PFM modes. Employing a single-loop, fully analog structure with a parallel path approach, provides for shared loop control voltage and in turn a smooth transition of the output voltage $V_{OUT}$ when the dummy load 31 engages or disengages. Additionally, the efficiency losses are reduced or minimized, as explained, by setting the dummy reference voltage (V_REFDMY) to the lowest value that still ensures safe ON and OFF times ($T_{ON}$ and $T_{OFF}$), thus reducing power wastage.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A method of operating a DC-DC converter, comprising:

driving a load demanding a load current with an output current;

when the output current is greater than a minimum output current, regulating the output current to be equal to the load current; and when the output current is less than the minimum output current:

regulating the output current to be equal to the minimum output current; and generating a dummy load current and subtracting the dummy load current from the output current that is regulated to equal the minimum output current;

wherein the dummy load current is generated to be equal to a difference between the minimum output current and the load current.

2. The method of claim 1, wherein the minimum output current provides for selected on and off times of the DC-DC converter that result in a minimum operating frequency of the DC-DC converter being maintained at a given level.

3. The method of claim 1, further comprising determining whether the output current is greater than the minimum output current or less than the minimum output current by:

comparing a feedback voltage indicative of the output current to a first reference voltage to produce a control voltage.

4. The method of claim 3, wherein the output current is regulated to be the minimum output current by:

generating a sum voltage as a sum of a voltage ramp and a voltage indicative of current through an inductor of the DC-DC converter;

comparing the control voltage to the sum voltage to produce a PWM signal; and controlling switching of the DC-DC converter based upon the PWM signal.

5. The method of claim 4, wherein the dummy load current is generated as a function of a difference between a reference dummy voltage representing a level of the control voltage at which the load current is equal to the minimum output current and the control voltage.

6. The method of claim 5, wherein the reference dummy voltage is determined based upon an input voltage to the DC-DC converter, an output voltage from the DC-DC converter, the load current, and a switching period of the DC-DC converter.

7. A DC-DC converter system, comprising:

a DC-DC converter driving a load demanding a load current with an output current at an output node;

a control voltage generation circuit configured to generate a control voltage based upon a comparison between a reference voltage and a feedback voltage indicative of the output current;

wherein the DC-DC converter is configured to regulate the output current to be equal to the load current when the control voltage is indicative of the output current being greater than a minimum output current;

wherein the DC-DC converter is configured to regulate the output current to be equal to the minimum output current when the control voltage is indicative of the output current being less than the minimum output current; and a dummy load configured to generate a dummy load current that is equal to a difference between the minimum output current and the load current and subtract the dummy load current from the output current equal to the minimum output current when the control voltage is indicative of the output current being less than the minimum output current.

8. The DC-DC converter system of claim 7, wherein the dummy load comprises:

a dummy current source transistor configured to generate the dummy load current as a function of a dummy gate control voltage; and a dummy control loop configured to generate the dummy gate control voltage as a function of a comparison between the control voltage and a reference dummy voltage.

9. The DC-DC converter system of claim 8, further comprising processing circuitry configured to generate the reference dummy voltage based upon an input voltage to the DC-DC converter, an output voltage from the DC-DC converter, the load current, and a desired switching period of the DC-DC converter.

10. The DC-DC converter system of claim 9, wherein the dummy control loop comprises:

a first amplifier having a non-inverting input coupled to the control voltage through a first resistor, with a second resistor being connected between the non-inverting input and an output of the first amplifier, and with the first amplifier having an inverting input coupled to the reference dummy voltage;

a first n-channel transistor having a drain connected to an input of a current mirror, a source coupled to ground through a third resistor, and a gate coupled to the output of the first amplifier;

a second n-channel transistor having a drain connected to an output of the current mirror, a source coupled to ground through a fourth resistor, and a gate coupled to the reference dummy voltage; and a fifth resistor connected between the output of the current mirror and the output node;

wherein the dummy gate control voltage is generated at the output of the current mirror;

wherein a gain between the control voltage and the dummy gate control voltage is a function of a product of a first ratio and a second ratio, the first ratio being a ratio between resistances of the second resistor and the first resistor, the second ratio being a ratio between resistances of the fifth resistor and the third resistor.

11. The DC-DC converter system of claim 10, wherein the control voltage generation circuit comprises:

a second amplifier having a non-inverting input coupled to a comparison voltage, and an inverting input connected to an output of the second amplifier, wherein the output of the second amplifier is connected to the first resistor.

12. The DC-DC converter system of claim 11, further comprising a third amplifier having a non-inverting input coupled to the feedback voltage, an inverting input coupled to the reference voltage, and an output at which the comparison voltage is generated.

13. The DC-DC converter system of claim 12, further comprising a feedback divider coupled between a top voltage and the output node, with the feedback voltage being produced at a tap of the feedback divider.

14. A method of operating a DC-DC converter to as to avoid operation in pulse skipping mode (PSM) or pulse frequency modulation (PFM) in light load conditions, the method comprising:

driving a load demanding a load current with an output current;

when the output current is less than a minimum output current:

regulating the output current to be equal to the minimum output current; and generating a dummy load current and subtracting the dummy load current from the output current that is regulated to equal the minimum output current;

wherein the dummy load current is generated to be equal to a difference between the minimum output current and the load current.

15. The method of claim 14, wherein the minimum output current provides for selected on and off times of the DC-DC converter that result in a minimum operating frequency of the DC-DC converter being maintained at a given level.

16. The method of claim 14, further comprising determining whether the output current is greater than the minimum output current or less than the minimum output current by:

comparing a feedback voltage indicative of the output current to a first reference voltage to produce a control voltage.

17. The method of claim 16, wherein the output current is regulated to be minimum output current by:

generating a sum voltage as a sum of a voltage ramp and a voltage indicative of current through an inductor of the DC-DC converter;

comparing the control voltage to the sum voltage to produce a PWM signal; and controlling switching of the DC-DC converter based upon the PWM signal.

18. The method of claim 17, wherein the dummy load current is generated as a function of a difference between a reference dummy voltage representing a level of the control voltage at which the load current is equal to the minimum output current and the control voltage.

19. The method of claim 18, wherein the reference dummy voltage is determined based upon an input voltage to the DC-DC converter, an output voltage from the DC-DC converter, the load current, and a switching period of the DC-DC converter.

* * * * *